United States Patent [19]

Bair

[11] 3,872,705

[45] Mar. 25, 1975

[54] APPARATUS FOR MANUFACTURING SLOTTED CORE STRUCTURES

[75] Inventor: Eugene C. Bair, Holland, Mich.

[73] Assignee: General Electric Company, Fort Wayne, Ind.

[22] Filed: Sept. 19, 1973

[21] Appl. No.: 398,691

Related U.S. Application Data

[62] Division of Ser. No. 197,269, Nov. 10, 1971, Pat. No. 3,762,041.

[52] U.S. Cl. ............... 72/393, 29/203 L, 29/205 D, 29/596, 72/363
[51] Int. Cl. ............................................. B21b 41/02
[58] Field of Search ........ 72/393, 363; 29/596, 598, 29/609, 203 D, 203 J, 203 L, 203 P, 205 D, 211 D; 310/216

[56] References Cited
UNITED STATES PATENTS

| | | | |
|---|---|---|---|
| 1,625,131 | 4/1927 | Miller | 72/393 |
| 1,934,903 | 11/1933 | Apple | 29/596 |
| 3,059,515 | 10/1962 | Lindsey | 83/5 |
| 3,320,451 | 5/1967 | Wiley | 310/259 |
| 3,490,143 | 1/1970 | Hull | 29/609 |
| 3,583,200 | 6/1971 | Cvijanovic | 72/399 |

*Primary Examiner*—C. W. Lanham
*Assistant Examiner*—James R. Duzan
*Attorney, Agent, or Firm*—Ralph E. Krisher, Jr.; Joe E. Barbee

[57] ABSTRACT

Apparatus for shaping surfaces such as restricted entrances of passageways in laminated magnetic cores. Apparatus includes core centering means, spline or rib means for orienting or aligning a slotted core and for gauging core slot entrances. Core slot entrance shaping means in the form of one or more tools is supported for radial movement relative to a core. Tools may be operated by hydraulic means to form lands along the entrance surfaces of wire admitting passageways of cores comprised of a plurality of juxtaposed laminations, at least some of which are at least slightly staggered or misaligned relative to one another.

7 Claims, 9 Drawing Figures

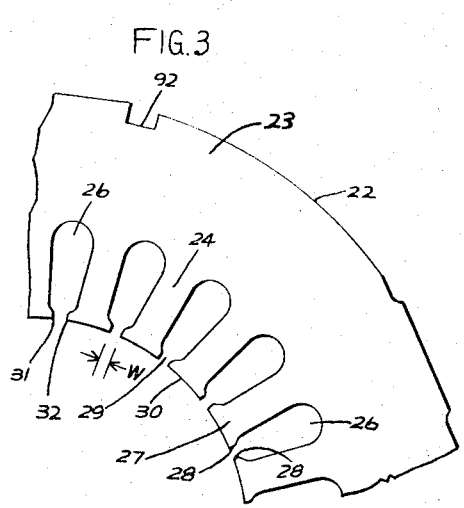
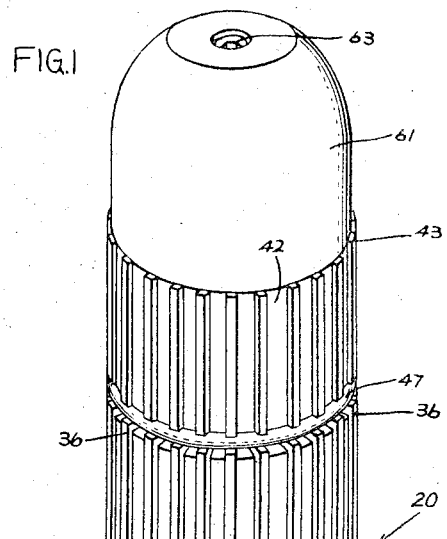
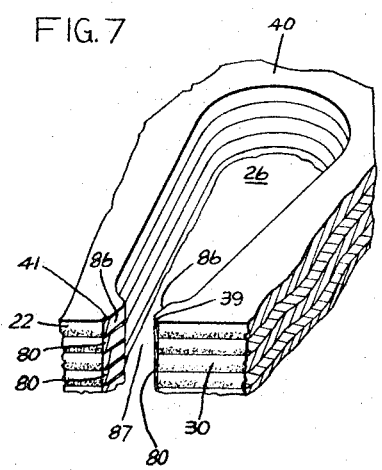
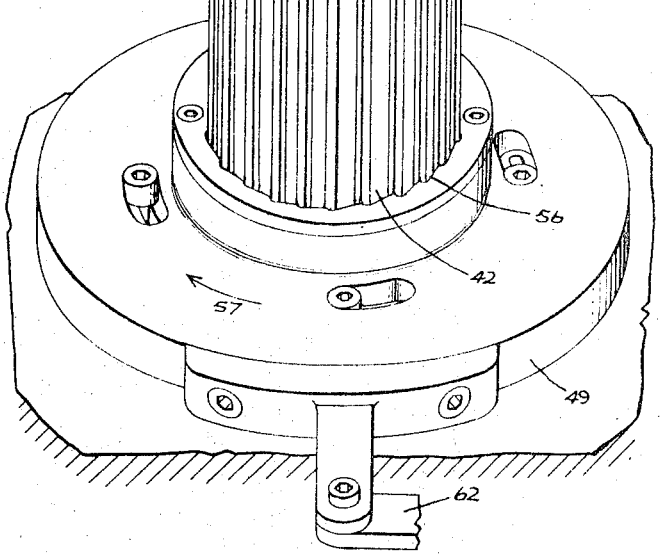
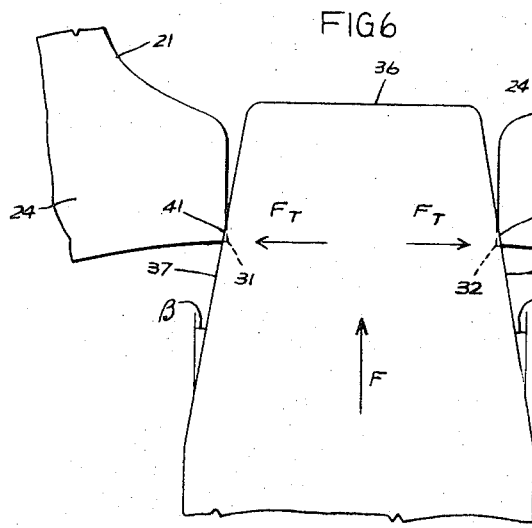
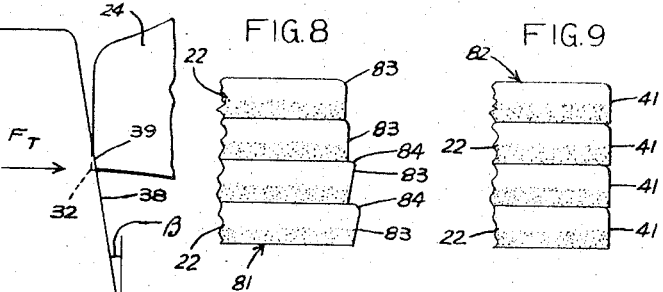

APPARATUS FOR MANUFACTURING SLOTTED CORE STRUCTURES

CROSS REFERENCE TO RELATED APPLICATIONS

This application is a division of my copending application Ser. No. 197,269, filed Nov. 10, 1971, now U.S. Pat. No. 3,762,041, and titled "SLOTTED CORE STRUCTURES AND APPARATUS AND METHODS FOR MANUFACTURING SAME."

BACKGROUND OF THE INVENTION

The present invention relates to apparatus for manufacturing slotted core structures for inductive devices. More particularly, it relates to apparatus of a type that is especially useful for establishing a desired configuration for at least the entrances of restricted, winding receiving passageways communicating with the slots in a core.

In the manufacture of laminated, magnetic cores, e.g., dynamoelectric machine stator cores, a plurality of substantially identical laminations are stamped or otherwise formed from magnetic material such as a sheet of steel. The laminations are then stacked and secured together to form a winding accommodating magnetic core. Thereafter, windings are positioned along winding turn accommodating regions of the core.

In the case of slotted dynamoelectric machine cores, one approach used to place windings on cores has included generating winding turns along the winding accommodating regions of the cores. Another approach has been to generate one or more winding coils of one or more turns each and then position side turn portions of such coils in the slots of the core. Both of these approaches have been previously described, e.g., in Sims' U.S. Pat. No. 3,471,926 which issued Oct. 14, 1969 and which is assigned to the assignee of this application.

With both of these general approaches, relative movement is effected between those regions of a core that establish the entrance portions of the restricted passageways of the core and the winding material (e.g., insulated copper or aluminum magnet wire). During such relative movement, the winding material conductor and insulation may be damaged as a result of contact with the restricted passageway entrance portions, and particularly when such portions are defined by relatively sharp corners of individual laminations. Moreover, means utilized in placing the windings, e.g., tools of the type shown in Arnold et al U.S. Pat. No. 3,579,818 or Mason U.S. Pat. No. 2,934,099, may also be damaged.

This damage, hereafter referred to as winding placement damage, may be in various forms and includes, for example, scraped or scratched insulation; nicked or broken wires; and nicked or broken winding placing means. While tool damage is often clearly observable, winding material damage is more often revealed during the performance of known tests, such as high potential or surge tests. Both types of damage represent a form of increased manufacturing cost and economic loss.

Thus, it would be desirable to provide improved apparatus for fabricating slotted magnetic cores so that winding placement damage and the costs associated therewith could be reduced, if not eliminated.

SUMMARY OF THE INVENTION

Accordingly, an object of the present invention is to provide improved apparatus that would be helpful in overcoming the above described and other problems.

Another object of the present invention is to provide apparatus for working sharp corners at the extremities of slots in individual laminations that have been stacked together to form a slotted magnetic core.

Still another object of the present invention is to provide apparatus for establishing laminated magnetic core slot entrances having a predetermined configuration.

The above and other objects are achieved in accordance with one form of the invention by new and improved apparatus by which portions, e.g., relatively sharp corners, of individual laminations along restricted slots entrances of a laminated magnetic core are shaped in a desired manner. In one preferred exemplification of apparatus, means such as a ribbed or splined member is provided for the purpose of orienting or aligning a slotted core and also for indicating cores having slot openings that are obstructed or that are less than a predetermined minimum size. The apparatus also includes entrance shaping means in the form of a plurality of one or more tools that are supported for movement in a radial direction relative to radially disposed slots of a magnetic core; and means for forcing such tool or tools into engagement with generally oppositely facing restricted entrance establishing portions of the magnetic core, and for shaping restricted entrance surfaces or the entry walls so that the surface configurations thereof conform to a predetermined configuration.

The subject matter which I regard as my invention is particularly pointed out and distinctly claimed in the concluding portion of this specification. The invention, itself, however, together with further objects and advantages thereof, may best be understood by reference to the following description taken in connection with the accompanying drawings.

BRIEF DESCRIPTION OF THE DRAWINGS

FIG. 1 is a perspective view, with parts removed and parts broken away, of apparatus exemplifying the invention in one form;

FIG. 3 is a plan view of a portion of a lamination of the type that may be stacked together to form a core having restricted slot entrances;

FIG. 6 is a view, with parts broken away, that illustrates how the apparatus of FIG. 1 may be operated to conform passageway entry walls to a shaping tool;

FIG. 7 is an enlarged perspective view, with parts broken away, that depicts the configuration of a restricted slot entrance along a laminated magnetic core; and FIGS. 8 and 9 are enlarged views of portions of cores that depict the configuration of laminations along restricted slot entrances before and after, respectively, such use of the apparatus of FIG. 1.

DESCRIPTION OF THE PREFERRED EMBODIMENTS

Figure 2:
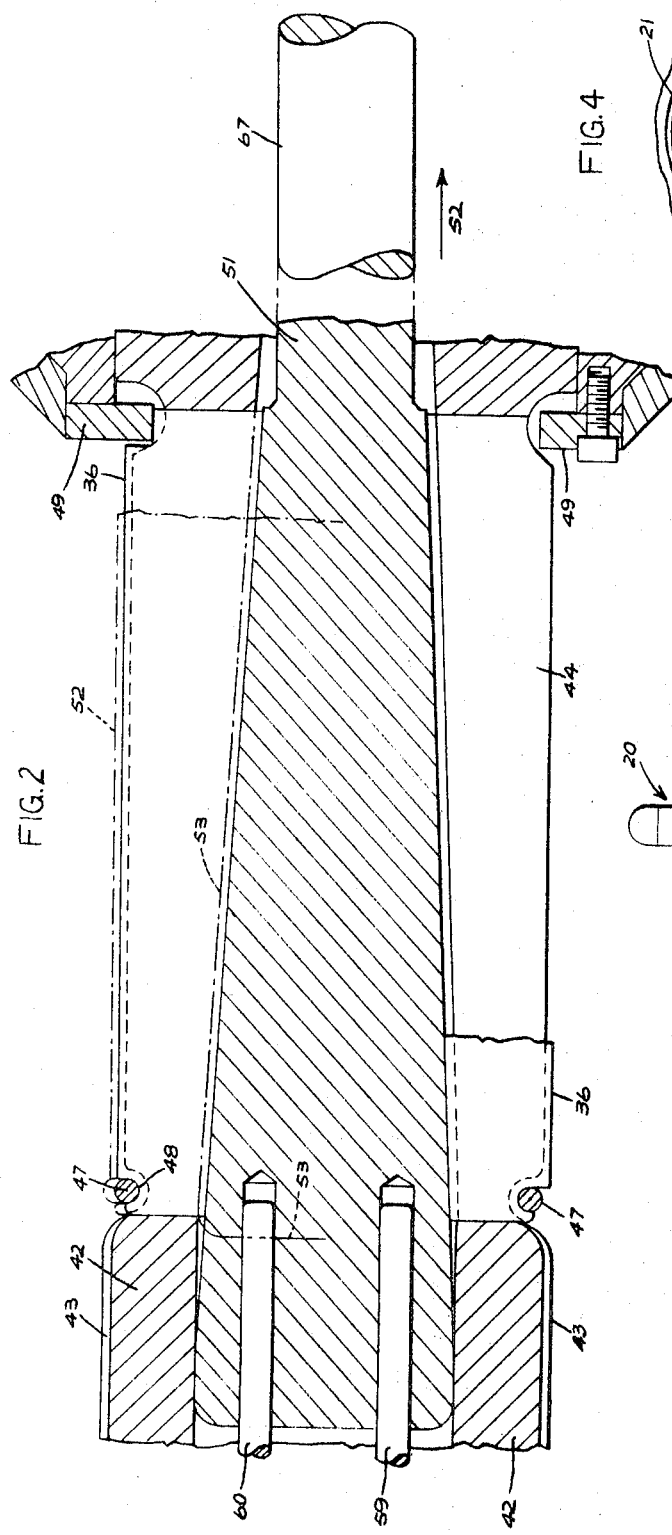
FIG. 2 is a side elevation of the structure shown in FIG. 1, with parts in section, removed, and broken away.
Figure 4:
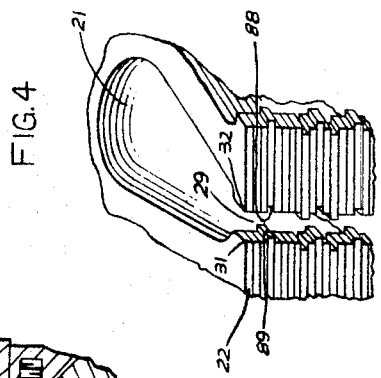
FIG. 4 is a fragmentary view of a core comprising a stack of the laminations illustrated in FIG. 3.

With reference now to FIGS. 1 and 3 through 5, I have illustrated an apparatus 20 that may be used to particular advantage during the fabrication of a slotted core 21. The core 21 in turn is comprised of a plurality of juxtaposed substantially identical laminations 22 secured together in any suitable fashion. For example, the laminations of the core 21 may be secured together by interlaminate bonds in the manner taught in Bobbie Hull U.S. Pat. No. 3,490,143. The laminations may also be secured together by the use of keys or weld beads extending axially along an external peripheral surface of the core and located at angularly spaced apart locations on such surface.

Since the core 21 is made up of a plurality of substantially identical laminations 22, the same reference numerals and terminology will be used herein to refer to parts of both the core 21 and laminations 22. Thus, the laminations and core comprise an annular yoke section 23 and a plurality of angularly spaced apart teeth or toothed sections 24 which define coil-accommodating regions that are illustrated in the form of slots 26.

The teeth 24 terminate at the free ends thereof in enlarged lips or tips 27 and the surfaces 30 of the teeth collectively form a bore axially disposed relative to the core 21 and the planar surfaces of the laminations 22. With reference to FIG. 3, it will be appreciated that oppositely facing slot entrance surfaces 28 of thet laminations define restricted passageways 29 that communicate with slots 26. These passageways terminate at the bore, as shown in the drawings, at adjacent relatively sharp and well-defined corners 31, 32.

With particular reference now to FIG. 3, it will be appreciated that, for a given stator core, a lamination such as the lamination 22 will be designed to have a predetermined nominal slot opening having a predetermined minimum width W between adjacent surfaces 28 at the bore of the lamination. As will be understood, for most convenient winding placement it would be desirable for the width W to be relatively large. However, from an electrical and magnetic performance viewpoint, the actual width W is selected as a compromise between the conflicting criteria associated with theoretical optimum magnetic and electrical characteristics and with the necessity of providing a sufficiently wide slot opening to permit movement of winding turns therepast in an economically feasible manner. Moreover, accepted practices in the lamination die art indicate the desirability of punching relatively sharp corners, when practical, in strip material from which the laminations 22 are formed. Thus, although the surfaces 28 could arguably be provided with a small radius, lamination dies currently in use generally produce laminations having teeth with sharp corners.

In addition, even if lamination dies were modified to produce laminations similar to laminations 22 but not having sharp corners such as the corners 31, 32, the width W of such openings would still be relatively small for performance reasons. Furthermore, it is believed that cores comprising stacks of such laminations would have reduced opening sizes because of apparently unavoidable, lamination misalignment that occurs in practice. Accordingly, while continuing reference will be made herein to laminations and cores having sharp corners; cores of laminations without such corners, and apparatus used with such cores may nonetheless embody my invention. Moreover, apparatus herein described may be used to advantage in the fabrication of cores that comprise laminations which differ in design from the design of laminations 22 in respects other than the presence or absence of corners.

In view of the foregoing, it will be appreciated that the following detailed description of lamination 22 is here included only for the purpose of completeness of description. The illustrated lamination 22 (and core 21) had an outer diameter of about 6¼ inches, a bore diameter of approximately 3⅛ inches and 24 evenly spaced slot defining teeth 24. The dimension W was typically about 0.094 of an inch for the lamination 22. It should be noted, however, that because of random stagger or misalignment of laminations 22 it is not precisely meaningful to equate the slot openings of core 21 as viewed in FIG. 4 to the slot openings of the individual laminations 22. Accordingly, in actual practice, because of at least some staggering of some of the individual laminations in the core 21, the restricted slot entrances of the core should not be expected to freely accommodate an elongate gauge bar although the same bar would be accommodated by slot entrances of the individual laminations used in fabrication of the core. For purposes of illustration and discussion, the staggering or misalignment of laminations in core 21 has been exaggerated in FIG. 4.

It is believed that the misalignment of laminations in a core and sharp corners at the winding receiving mouth of a laminated core both contribute to manufacturing losses, e.g., the winding placement damage discussed above, in actual practice.

Means for fabricating new and improved cores, and by which winding placement damage may be reduced, if not eliminated, will now be described with primary reference being made to FIGS. 6, 7, 1, 2, and 5 of the drawings. The fabrication of cores to be worked on by apparatus embodying my invention includes assembling a laminated magnetic core from a plurality of substantially identical laminations. Thereafter, the restricted slot entrances or entry walls are conformed to a predetermined desired size and configuration. For cores having sharp corners such as the corners 31, 32 of core 21, the step of conforming or configuring involves working or shaping the corners of at least some of the laminations of the core 21 by flattening the sharp corners 31, 32 thereof. For cores not having such well defined corners, slot entrance wall segments will be shaped like, e.g., segments 39, 41 as viewed in FIGS. 6 and 7.

A preferred procedure for accomplishing this may be better understood by now viewing FIG. 6 wherein a tool 36 has been moved radially in the direction of the arrow F relative to the core 21. The illustrated tool 36 is tapered or wedge shaped and the mouth or entrance of the slot accommodating the tool is conformed to the configuration of the tool. The relatively sharp corners 31, 32 of one or more laminations of the core 21 have been represented in phantom in FIG. 6 as they would appear prior to shaping the entrances of the restricted passageways of the core 21.

It will be understood that the core 21 is initially aligned relative to a plurality of the tools 36 and that the working faces 37, 38 of each of such tools substantially simultaneously shape the restricted entrances of the core slots. This provides the desirable result of applying generally balanced forces in the direction of arrow $F_T$ about the core so as to avoid undesirably warping or otherwise damaging the core. In addition, all core slot entrances are conformed at approximately the same time. This avoids still another problem of non-uniformity that could result from shaping the core slot entrances one at a time and deflecting the teeth 24 rather than shaping selected surfaces regions thereof. After separation of the core and tools 36, the core slot entrances would be configured as shown at the entrance of slot 26 of core 40 in FIG. 7. In the core 40, sharp entrance corners have been removed or displaced and lands, e.g., tapered entry walls 39, 41 have been established in conformity with the faces 37, 38 of a tool 36.

Figure 5:
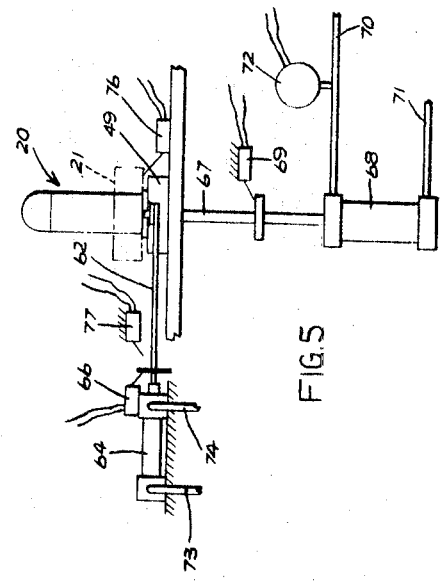
FIG. 5 is a schematic illustration of the apparatus shown in FIG. 1, and shows, in phantom, the core of FIG. 4 positioned relative to such apparatus.

FIGS. 1, 2 and 5 illustrate a preferred form of the apparatus 20. First comparing FIGS. 1 and 2, it will be noted that the apparatus 20 includes a generally cylindrical tool carrier 42. An upper section of this carrier is provided with core aligning means in the form of splines or ribs 43. However, the lower portion of the carrier is provided with a plurality of tool accommodating, axially extending slots 44 that are in axial alignment with the ribs 43.

Since the apparatus 20 is particularly adapted for use with the twenty-four slot cores 21, 40, a total of 24 splines 43 and a total of 24 slots 44 have been provided in the carrier 42. Furthermore, since the slots in cores 21, 40 are substantially identical and evenly spaced, the tools 36, ribs 43, and slots 44 are evenly spaced. It will be understood, however, that the particular configuration of a given core; in terms of slot size, shape, orientation, number, and spacing; will determine the specific design details of other apparatus, or of modifications that would be made to the apparatus 20.

Slidably received within each of the slots 44 of the housing or carrier 42 is a tool or core working device 36. As revealed in both FIGS. 1 and 2, an expandable retaining ring 47 co-operates with relieved regions 48 of the tools 36. This ring prevents inadvertent movement of a first end of the tools 36 radially outwardly relative to the casing or carrier 42. The other end of the tools 36 are retained in assembled relationship with the carrier by means of a camming ring or disc 49 which, with tension or compression ring 47, insures the return of the tools 36 to a retracted position when desired, as will be described in more detail hereinafter.

Movement of a cam, e.g., tapered plug 51 within the carrier 42 can move the tools 36 radially outwardly, assuming that the camming ring 49 is positioned to permit radially outward movement of the tools 36 relative to the carrier 42. The relative direction of this movement is indicated by the arrow 52 in FIG. 2. Such movement of plug 51 will result in movement of the tools 36 from the dwell position thereof to an expanded or working position as represented for example by the phantom outline 52 in FIG. 2. Thereafter, upon return of the plug 51 from the position shown by phantom line 53 to the dwell position thereof (as shown in FIG. 2) the ring 47 and camming ring 49 return the tools 36 to their dwell position. As revealed in the drawings, an edge of each of the tools 36 is tapered to correspond to the taper of plug 51. Moreover, lands are preferably formed on the plug 51 to provide seats for the tools 36.

The camming ring 49 includes a plurality of camming surfaces 56, each of which co-operate with one of the tools 36. The ring 49 rotates or shifts about the carrier 42 (e.g., as indicated by the arrow 57 in FIG. 1) in response to a cylinder rod connected thereto through linkage 62.

Now referring to FIG. 2 in conjunction with FIG. 1, the plug 51 is guided, during axial movement thereof, by alignment pins 59, 60. These pins in turn are carried by a disc-like retainer under the nose plug or cap 61. This not shown retainer is secured, e.g., by screws, to the carrier 42. The cap 61 in turn is secured by threaded fastener 63 to the not shown retainer disc. The illustrated cap 61 may be used for the advantageous purpose of centering a core relative to the carrier 42 and to splines or tools supported or guided thereby.

In the utilization of apparatus 20, a core is first centered on the cap 61, and then moved along the ribs 43 with the ribs disposed in the slot entrances. In the case of core 21, the ribs or keys 43 will project a radial distance of about one-sixteenth of an inch into the core slot entrances and the ribs have a transverse dimension of about 0.085. Thus, the ribs 43 will act as gauges that will detect the presence of obstructed core slot entrances or unacceptably undersized slot entrances. In this manner it is assured that all cores that are admitted to the tools 36 in the exemplified apparatus will have unobstructed slot openings, as determined by the ribs 43. Accordingly, the possibility of breaking or otherwise severely damaging the tools 36 by attempting to move them into the entrances of a severely or completely obstructed core slot entrance is avoided with the apparatus 20.

The cross-sectional configuration of the tools 36, as will be understood, may be varied for given core designs so that desired suitable operation of the apparatus 20 will result. I have obtained suitable results with cores made from laminations 22 using wedge shaped tools 36 as shown in FIG. 6 that have a pressure angle B of about 10°. When the tools 36 are in the retracted position thereof, it is preferred that the radially outer edges thereof extend into the core slot entrances at least slightly, e.g., about 0.015 of an inch, so that proper alignment of the core and tools is maintained.

Thereafter, the tools 36 are moved radially outwardly a sufficient distance to shape the core slot entrance surfaces and conform them to the desired configuration. For cores made from the laminations 22, I have found that satisfactory results are obtained when the tools 36 shape the slot openings to have a dimension of about 0.094 inches at the bore of the core. Also, the core slot entry walls will be tapered along portions 39, 41 in conformity with the tool surfaces and the irregularity thereof due to staggered laminations will be diminished.

It will be recalled from the above description that the laminations 22 have slot entrance openings at the bore of nominally 0.094 of an inch. However, after laminations 22 have been assembled together to form a core 21, the "net" or "effective" dimension of the core slot openings at the bore is more typically 0.087 inches. Thus, the apparatus 20, by establishing a "net" or "effective" opening of 0.094 of an inch, may be said to establish core slot entrance openings that at least approximate the previously established slot entrance openings in individual laminations within the core.

Moreover, by shaping the entry walls of the restricted core slot entrances, sharp corners therealong will be reduced, or eliminated; and relatively smooth and uniform core slot openings around the core will be provided.

With the illustrated apparatus 20, and with cores having any desired stack height and formed from the laminations 22, the tools 36 are preferably formed from a material having suitable hardness, strength, and wear characteristics. One example of material suitable for this purpose is CARBOLOY 370 material sold by the General Electric Company. This material has been used to fabricate tools 36 having a pressure angle of approximately 10° as indicated and described in connection with FIG. 6. Such tools have been forced radially outwardly into the entrances of the restricted core slots with forces generated by the application of e.g., 700 to 1,000 psi hydraulic fluid to a 1½ inch stroke, 6 inch bore hydraulic cylinder, that in turn advanced the plug 51, with the plug having a taper of 3° (three degrees) and each of the tools 36 having a corresponding 3° taper.

Since twenty-four tools 36 are driven radially outwardly substantially simultaneously by plug 51, balanced forces are developed around the yoke 23 of the cores 21. Based on an estimated radial component of resultant force (F in FIG. 6) of 15,000 to 18,000 pounds applied to each tool by the plug 51, the resultant tangentially directed force ($F_T$ in FIG. 6) applied by each face of each tool against a side of a core slot will be about 51,000 pounds. However, while this force is sufficient to form reltively smooth entrance walls, the teeth and yokes of cores are not otherwise affected thereby.

One cycle of operation of the exemplified apparatus 20 will now be described, with primary reference being made to FIGS. 5, 1 and 2. Initially, a relatively small hydraulic cylinder 64 is retracted and linkage 62 holds the camming ring 49 in a "release" position to permit the radially outward movement of the tools 36. When the camming ring is in the release position, a limit switch 66 is actuated by the linkage 62 or other suitable means such as the illustrated flag carried by the linkage.

At the beginning of a cycle, the rod 67 of hydraulic cylinder 68 will be in a fully extended position and the plug 51 will be in the solid line position thereof relative to the carrier 42 as viewed in FIG. 2. Thus, the tools 36 will be retracted. Prior to the start of a cycle, the second limit switch 69 will also be closed. A cycle of operation is commenced by movement of a core 21 against a third limit switch 76 as the core is moved into place relative to the tools 36.

At this time, conventional hydraulic valves, interconnected through a conventional control circuit, are sequentially operated to advance and return the cylinders 64 and 68. For example, a valve on lines 70 and 71 to cylinder 68 connects line 70 to a hydraulic fluid supply source, and line 71 to a hydraulic return line. This causes the rod 67 to retract and the tools 36 to expand and shape the core slot entrances.

When continued retraction of the rod 67 is prevented (either by a travel limiting means associated with the apparatus frame or cylinder 68, or by restraint upon the tools 36) pressure builds up in line 70 and actuates a conventional pressure switch 72. The switch 72 then supplies a signal to the control circuit, whereupon the line 73 of the camming ring drive cylinder 64 is connected to the pressure source, and the camming ring is urged in a direction to retract the tools 36. At about this same time, the fluid circuit connections to lines 70 and 71 are reversed and the rod 67 returns the plug 51 to its initial position. By suitable means, e.g., a conventional limit switch 77, the fluid circuit connections to lines 73 and 74 are reversed and rod of cylinder 64 is returned to its initial position. The core is then removed from the apparatus 20. Alternatively, a mechanical limit switch response to removal of the core may initiate the final reversal of fluid pressure on lines 73 and 74.

Having now described in detail a preferred form of apparatus exemplifying the present invention, it will be understood that numerous advantageous results may now be obtained by utilization of the invention. For example, the effective size of the admitting openings of core slots may be readily increased without increased size of such openings in individual laminations and thereby causing a concomitant decrease in magnetic characteristics of the core. In the case of the core 21 described above, "effective" core slot opening sizes can be increased from about 0.087 of an inch to about 0.094 of an inch. This in turn may result in a reduced incidence of stator cores rejected because of surge test failure.

In addition, savings may now be realized due to a reduced incidence of broken winding placing tooling and the losses associated with equipment down time and set up time due to repairing or replacing such tooling. Moreover, it is believed that at least some dimensional tolerances for such tooling may now be increased.

With reference to FIG. 7, a more detailed description of the core 40 will now be presented. As previously indicated, the core 40 is comprised of a plurality of laminations 22 stacked together in juxtaposed relation. Moreover, some of the laminations 22 are at least slightly staggered or misaligned relative to one another, i.e., the edge surfaces of the laminations are so disposed that the side walls 86 of the restricted wire admitting passageways 87 have "notches" or "grooves" and "projections" therealong (e.g., as shown in an exaggerated manner at grooves 88 and projections 89 of the core 21 in FIG. 4).

These notches and grooves result when the laminations are stacked together on a stacking fixture with alignment pins projecting along the slots or other core passageways (e.g., peripheral notches or keyways such as the notch 92 in FIG. 3). Since a clearance necessarily is provided between the alignment pins and lamination passageway or slot walls adjacent thereto, it normally occurs that one side of some lamination passageways or slot walls will bear against an alignment pin, whereas an opposite side wall of slots in other laminations will bear against the other side of the alignment pin. This, in turn, results in some laminations in a core being circumferentially shifted relative to others. The amount of shifting resulting from the stacking approach just described is one example of what is meant by "slightly staggered or misaligned."

The actual amount of this staggering will of course vary, depending on the tolerances between laminations and alignment pins and on the dimensions of the laminations, among other things. However, for the laminations 22 having dimensions as stated above, the corners 31 and 32 of a tooth 24 typically may be staggered up to about 0.003 of an inch along the bore of a core.

Thus, if one lamination in a given core were shifted 0.003 of an inch along the bore in one direction, a second lamination were shifted 0.003 of an inch along the bore in an opposite direction, and all other laminations in the given core stack were perfectly aligned, the width of the core slot entrances would, in effect, be 0.006 of an inch less than would be the case if all laminations in the given core were perfectly aligned.

At this point it should again be noted that even if all laminations in a core were perfectly aligned, benefits could still be attained from utilization of the invention in view of the fact that sharp entrance corners adjacent slot entrances may be shaped to form relatively smooth lands along the slot entrances even in the absence of lamination misalignment. In addition, it is to be understood that a configured surface such as that shown at 41 in FIG. 7 is made up of a plurality of generally coplanar surfaces 80, each of which is formed on a separate lamination. Moreover, the surfaces 39 and 41 are to be considered to be lands even though one or more severely misaligned laminations may have unworked corners thereof spaced from the plane of the surfaces 80.

Cores corresponding to the cores 21 and 40 were closely examined in order to ascertain the configuration of the restricted entrance surfaces of slots therein. Both cores were made of approximately three inch stack of laminations 22 plus end laminations as will be understood. One of these cores was not operated on with equipment embodying the invention i.e., the apparatus of FIG. 1 was not utilized to shape the slot entrances thereof. A portion of this core is shown at 81 in FIG. 8. A corresponding view of a corresponding portion of the core 40 (of FIG. 7) is shown at 82 in FIG. 9.

A hand held 40 power magnifying glass was used to examine the bore defining surfaces of both of these cores in the vicinity of the slot defining tooth tips of the cores. The same glass was also used to examine the sharp tooth tip corners or shaped surfaces of the respective cores. The approximately triangular in outline, shaped surface 41 in FIG. 7 were then drawn to correspond to what was visually observed during inspection of the core 40 embodying the invention.

The views shown in FIGS. 8 and 9 were also drawn with parts removed and broken away, to correspond to what was observed during visual inspection of the two cores. It will be noted that the corners or tips 83 of the laminations in core portion 81 clearly indicated evidence of lamination misalignment; presented undesirable relatively sharp surface regions as shown at 84; and established a generally irregular and rough (as viewed under 40 power magnification) entrance along a side of a slot.

However, examination of portions 82 of the other cores revealed, as shown in FIG. 9, generally planar, slot entrance defining surfaces 41. Thus, the slot entrance defining surfaces of the core 40 were shaped to correspond to a more desirable configuration.

Persons skilled in the art will now understand that the above and still other advantages may be obtained by following the inventive teachings disclosed herein. Accordingly, while I have described what at present are considered to be the preferred embodiments of my invention and exemplifications thereof, it will be obvious to those skilled in the art that numerous changes and modifications may be made therein within the true spirit and scope of the invention.

What I claim as new and desire to secure by letters patent of the United States is:

1. Apparatus for shaping a plurality of angularly spaced apart restricted axially extending slot entrance surfaces along a generally cylindrical bore of a laminated magnetic core, said apparatus comprising: a tool carrier, a plurality of tools supported for movement relative to the carrier and angularly spaced apart to correspond to a predetermined angular spacing between restricted slot entrances of the laminated magnetic core; and cam means for urging the tools to a dwell position relative to the carrier and for substantially simultaneously moving said plurality of tools along predetermined paths from the dwell position thereof into force transmitting contact with surface regions of restricted slot entrance surfaces of the magnetic core positioned adjacent thereto and along the generally cylindrical bore; said tools being provided with axially extending core engaging surfaces for shaping the axially extending restricted core slot entrance surfaces so that the slot entrance will have a predetermined axially extending opening of uniform width.

2. The apparatus of claim 1 wherein said tools are elongate and tapered in form.

3. The apparatus of claim 1 wherein the tools are supported for radial movement relative to a circumference of a generally cylindrical tool carrier; and the cam means includes at least one tool driver having a tapered surface in engagement with at least one tool, the at least one tool driver being disposed within the tool carrier.

4. Apparatus for conforming the configuration of surfaces along at least the entrances of axially extending restricted passageways in laminated magnetic cores, said apparatus comprising: means for shaping selected surfaces associated with the axially extending passageways along such magnetic cores; and means for gauging predetermined portions of given passageways of such magnetic cores and confirming a predetermined orientation of such magnetic cores relative to said means for shaping; said means for gauging and confirming being positioned, relative to the means for shaping, to prevent movement of a magnetic core having the given passageways thereof obstructed into proximity with said means for shaping.

5. The apparatus of claim 4 wherein said means for shaping comprise a plurality of tools supported for movement into force transmitting engagement with restricted passageway entrance surfaces of a magnetic core positioned adjacent thereto.

6. The apparatus of claim 4 wherein said means for gauging and confirming comprise a plurality of angularly spaced apart keys.

7. The apparatus of claim 4 wherein said means for shaping includes a plurality of tapered tool blades, a first cam for driving the tool blades along predetermined paths in a first direction, and a second cam for driving the tool blades along the predetermined paths in a direction generally opposite to the first direction.

* * * * *